United States Patent
Ramzan et al.

(10) Patent No.: US 8,341,737 B1
(45) Date of Patent: Dec. 25, 2012

(54) DETECTING FRAUDULENT WEB SITES THROUGH AN OBFUSCATED REPORTING MECHANISM

(75) Inventors: Zulfikar Ramzan, Cupertino, CA (US); Oliver Friedrichs, Woodside, CA (US); Andrea Del Miglio, Milan (IT); Candid Wüest, Dachsen (CH); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 1286 days.

(21) Appl. No.: 12/059,741

(22) Filed: Mar. 31, 2008

(51) Int. Cl.
*H04L 29/06* (2006.01)

(52) U.S. Cl. ............... 726/22; 726/23; 726/24; 726/25; 726/26; 726/27; 726/1; 713/150; 713/162; 713/168; 709/217; 709/218; 709/228; 705/75; 705/74

(58) Field of Classification Search .................... None
See application file for complete search history.

(56) References Cited

U.S. PATENT DOCUMENTS

| | | | |
|---|---|---|---|
| 6,691,113 B1* | 2/2004 | Harrison et al. ........................ 1/1 |
| 7,584,255 B1* | 9/2009 | Hogeboom et al. .......... 709/206 |
| 7,788,603 B2* | 8/2010 | Lu et al. ......................... 715/826 |
| 8,109,819 B2* | 2/2012 | Hughes et al. ..................... 463/9 |
| 2002/0150276 A1* | 10/2002 | Chang ............................. 382/100 |
| 2003/0061286 A1* | 3/2003 | Lin ................................. 709/205 |
| 2004/0006605 A1* | 1/2004 | McCollum et al. ........... 709/218 |
| 2005/0257261 A1* | 11/2005 | Shraim et al. ................... 726/22 |
| 2006/0041508 A1* | 2/2006 | Pham et al. ..................... 705/50 |
| 2007/0226062 A1* | 9/2007 | Hughes et al. ................... 705/14 |
| 2007/0261112 A1* | 11/2007 | Todd et al. ........................ 726/11 |
| 2008/0046738 A1* | 2/2008 | Galloway et al. ............. 713/176 |
| 2008/0133540 A1* | 6/2008 | Hubbard et al. ................ 707/10 |
| 2009/0077383 A1* | 3/2009 | de Monseignat et al. ...... 713/175 |
| 2009/0138937 A1* | 5/2009 | Erlingsson et al. ............... 726/1 |
| 2009/0192944 A1* | 7/2009 | Sidman et al. ................... 705/75 |
| 2010/0031168 A1* | 2/2010 | Loriedo et al. ................ 715/760 |
| 2010/0281389 A1* | 11/2010 | Hutchinson .................... 715/736 |
| 2011/0078321 A1* | 3/2011 | Muret et al. .................... 709/228 |

OTHER PUBLICATIONS

Ronda, Troy et al., "iTrustPage: A User-Assisted Anti-Phishing Tool", Proceedings of the EuroSys 2008 Conference, Apr. 2008, 12 pages, Glasgow, Scotland.

Wong, Kelvin, "Flash-redirect scam: Phishing on eBay", Wongo's Scraps of Code Web Page, Posted on Aug. 18, 2007, 5 pages, [online] [Retrieved on Jan. 1, 2009] Retrieved from the Internet <URL:http://www.kelvinwong.ca/2007/08/18/scam-autopsy-ebay-auction-phishing/>.

Zhang, Yue et al., "Cantina: A Content-Based Approach to Detecting Phishing Web Sites", Proceedings of the International World Wide Web Conference (WWW) 2007, May 2007, pp. 639-648, Banff, Alberta, Canada.

* cited by examiner

*Primary Examiner* — Syed A. Zia
(74) *Attorney, Agent, or Firm* — Fenwick & West LLP

(57) ABSTRACT

A callback component embedded on a web site determines a current location of the web site. The current location is compared to a known legitimate location of the web site to determine if the web site has been copied to a different host location. Responsive to determining that the web site has been copied to a different location, the callback component alerts a central authority that the web site may be a fraudulent web site set up to launch phishing attacks. If the central authority determines that the web site is fraudulent, the central authority alerts appropriate entities to take down the fraudulent web site. The callback component generates a visual component viewable on the web site to deter phishing attackers from removing the callback component when the web site is copied.

20 Claims, 5 Drawing Sheets

DETECTING FRAUDULENT WEB SITES THROUGH AN OBFUSCATED REPORTING MECHANISM

BACKGROUND

1. Field of Art

The disclosure generally relates to computer security, and more specifically to detecting fraudulent web sites.

2. Description of the Related Art

Internet fraud is a serious problem for both businesses and consumers. In particular, Internet users are under constant threat from various computer and network sources. In one prevalent type of online scam known as "phishing", a fraudulent web site is set up that impersonates a well-known trusted web site. Targeted web sites often include bank web sites, credit card web sites, e-commerce sites, and other web sites of established institutions. The fraudulent web site is made to look authentic enough that the user will believe that he or she is viewing a legitimate web site of the established institution. Users are directed to the fraudulent web site and are tricked into entering sensitive information such as usernames, passwords, credit card information, social security numbers, etc. This information is collected by the attackers and can be used for various criminal purposes.

To direct users to the fraudulent website, the phishing attacker often sends out an email falsely claiming to be the legitimate institution. The email may claim, for example, that there is a problem with the user's online account or with a recent transaction using the web site. The user follows a hyperlink in the email to the fraudulent web site and is prompted for various types of personal information. Because the fraudulent web site is designed to look and operate like the trusted web site, many users do not realize that they are being tricked. Thus, users are highly likely to willingly provide the requested personal information.

Creating such fraudulent web sites is simple and inexpensive because source code for the legitimate web sites is readily available for download. Thus, a phishing attacker can simply copy code from the legitimate web site and create a replica of the web site with little effort. Phishing is a significant problem not only because of the fraud involved, but because it undermines user's confidence in online transactions and makes it difficult for online companies to communicate with their customers via email. Thus, phishing affects both the users that are being scammed by the phishing attack and the institutions that are being impersonated. Therefore, what is needed is a system for detecting fraudulent web sites in order to prevent or deter phishing attacks.

SUMMARY

A method, system, and computer readable storage medium detects fraudulent web sites using a callback component embedded on a web page. When a web page is downloaded from a web site, the callback component determines a current location of the web site. The current location of the web site is compared to a known legitimate location of the web site. Responsive to determining that the current location of the web site is different than the known legitimate location of the web site, a report is issued indicating that the web site is fraudulent.

In one embodiment, the callback component compares the current location to the known legitimate location and transmits a report to a central authority indicating if the locations are different. In an alternative embodiment, the callback component transmits the determined current location of the web site to the central authority and the central authority performs the comparison to determine if the current location is different than the known legitimate location. If the central authority determines that the web site is fraudulent, the central authority alerts one or more controlling entities so that the web site can be taken down.

In one embodiment, the callback component generates a visual component viewable on the web page when the web page is loaded by a browser. The visual component deters an attacker from attempting to remove the callback component when the fraudulent web site is copied from the legitimate location. Furthermore, in one embodiment, the callback component comprises obfuscated code so that the callback component is resistant to tampering.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the detailed description, the appended claims, and the accompanying drawings, in which:

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and methods illustrated herein may be employed without departing from the principles described herein.

Figure 1:
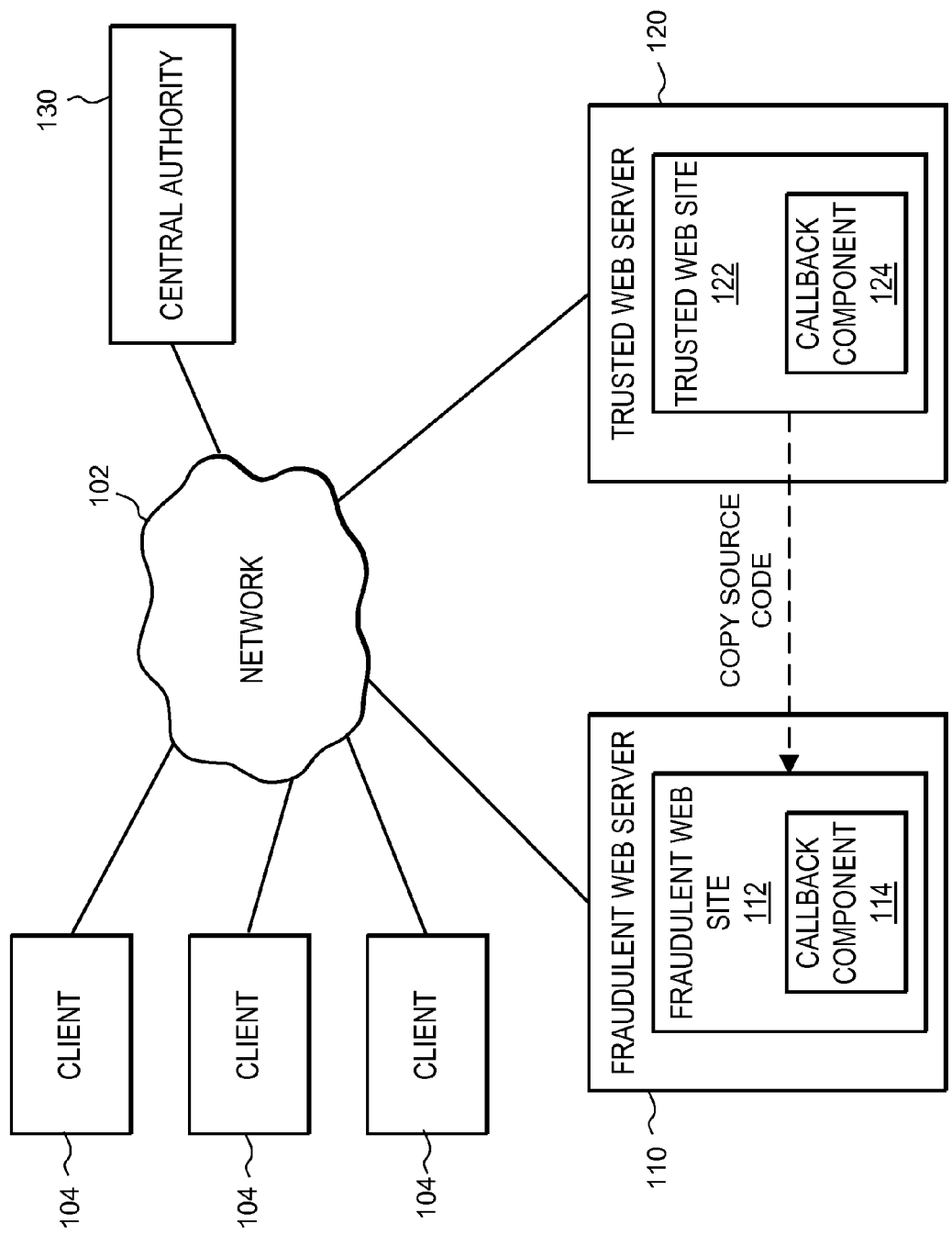
FIG. 1 is a high-level block diagram of a computing environment according to one embodiment.

FIG. 1 is a high-level block diagram of a computing environment 100 according to one embodiment. The computing environment 100 comprises a central authority 130, web servers 110 and 120, and clients 104 all connected by a network 102. Only three clients 104 and two web servers 110, 120 are shown in FIG. 1 in order to simplify the description. Embodiments of the computing environment 100 can have many more clients 104 and many more web servers 110, 120 connected to the network 102.

In one embodiment, a client 104 is a computer used by one or more users to perform activities including downloading, installing, executing files, and/or browsing web sites (e.g., web sites 112, 122) accessible via the network 102. In other embodiments, the client 104 is a network-capable device other than a computer, such as a personal digital assistant (PDA), a mobile telephone, a pager, a television "set-top box," etc. An embodiment of a computer system for use as a client 104 is described in more detail below with reference to FIG. 2.

The network 102 represents the communication pathways between the clients 104, the web servers 110, 120, and the central authority 130. In one embodiment, the network 102 is the Internet. The network 102 can also utilize dedicated or private communications links that are not necessarily part of the Internet. In one embodiment, the network 102 uses standard communications technologies and/or protocols. Thus, the network 102 can include links using technologies such as Ethernet, 802.11, integrated services digital network (ISDN), digital subscriber line (DSL), asynchronous transfer mode (ATM), etc. Similarly, the networking protocols used on the network 102 can include the transmission control protocol/Internet protocol (TCP/IP), the hypertext transport protocol (HTTP), the simple mail transfer protocol (SMTP), the file transfer protocol (FTP), etc. The data exchanged over the network 102 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The web servers 110, 120 can include one or more standard computer systems such as the computer system of FIG. 2 described below. The web servers 110, 120 are configured to communicate with the clients 104 and the central authority 130 via the network 102. The trusted web server 120 hosts a trusted web site 122 of an established institution and provides access to the web site 122 via the network 102. For example, the trusted web site 122 may be a web site of a bank, a credit card company, an e-commerce company, or another company where a user holds an online account. Typically, the trusted web site 122 is comprised of web pages including HTML documents (or other source code) and linked objects such as images, videos, audio files, Flash objects, JAVASCRIPT objects, etc. A client device 104 downloads the web pages from the trusted web site 122 and displays the web pages in a web browser.

The fraudulent web server 110 is used by a phishing attacker to host a fraudulent web site 112. The fraudulent web site 112 includes web pages designed to look and operate like the web pages of the trusted web site 122. Typically, the phishing attacker copies the source code and linked objects of the trusted web site 122 to the web server 110. In this way, the fraudulent web site 112 appears to be identical or very similar to the trusted web site 122. Thus, visitors to the fraudulent web site 112 may believe that they are visiting the trusted web site 122 and willingly provide sensitive information such as such as passwords, PIN numbers, credit card information, etc. This information can then be collected by the phishing attacker operating the fraudulent web site 112.

In order to prevent or deter phishing attacks, the trusted web site 122 includes a callback component 124. The callback component 124 comprises an object embedded on a web page of the trusted web site 122. When a client 104 accesses the trusted web site 122, the client 104 downloads the callback component 124 with the web page and the client web browser executes the callback component 124. The callback component 124 identifies the hosting server 120 of the web site 122 when the callback component 124 is loaded and executed by the web browser. This information can be used to verify that the web site 122 is hosted on the trusted web server 120.

If a phishing attacker copies the trusted web site 122 to set up the fraudulent web site 112, the callback component 124 is also copied. Thus, the fraudulent web site 112 includes a copied callback component 114. When the fraudulent web site 112 is loaded in a client web browser, the browser executes the copied callback component 114. The copied callback component 114, when executed, identifies the host location of the fraudulent web site 112. The copied callback component 114 then reports its location to the central authority 130. In one embodiment, the copied callback component 114 further recognizes that the web site 112 is hosted on a web server 110 different than the trusted server 120 and reports that the web site 112 has been copied to a location different from its intended location. An embodiment of a callback component 114, 124 is described in more detail below with reference to FIG. 3.

The central authority 130 is a trusted entity that receives reports from the callback components 114, 124. In one embodiment, the central authority 130 comprises one or more standard computing systems such as the computer system of FIG. 2 described below. The central authority 130 analyzes the reports to detect fraudulent web sites 112. Based on the analysis, the central authority 130 can alert various entities so that appropriate action can be taken against a fraudulent web site 112. In one embodiment, the central authority 130 also tracks various statistics from the reports received from the callback components 114, 124. For example, the central authority 130 may track the frequency of callbacks from a copied callback component 114. This information can be used to determine how many users may have been affected by an attack. An embodiment of a method executed by the central authority 130 for detecting fraudulent web sites is described in more detail below with reference to FIG. 5.

Figure 2:
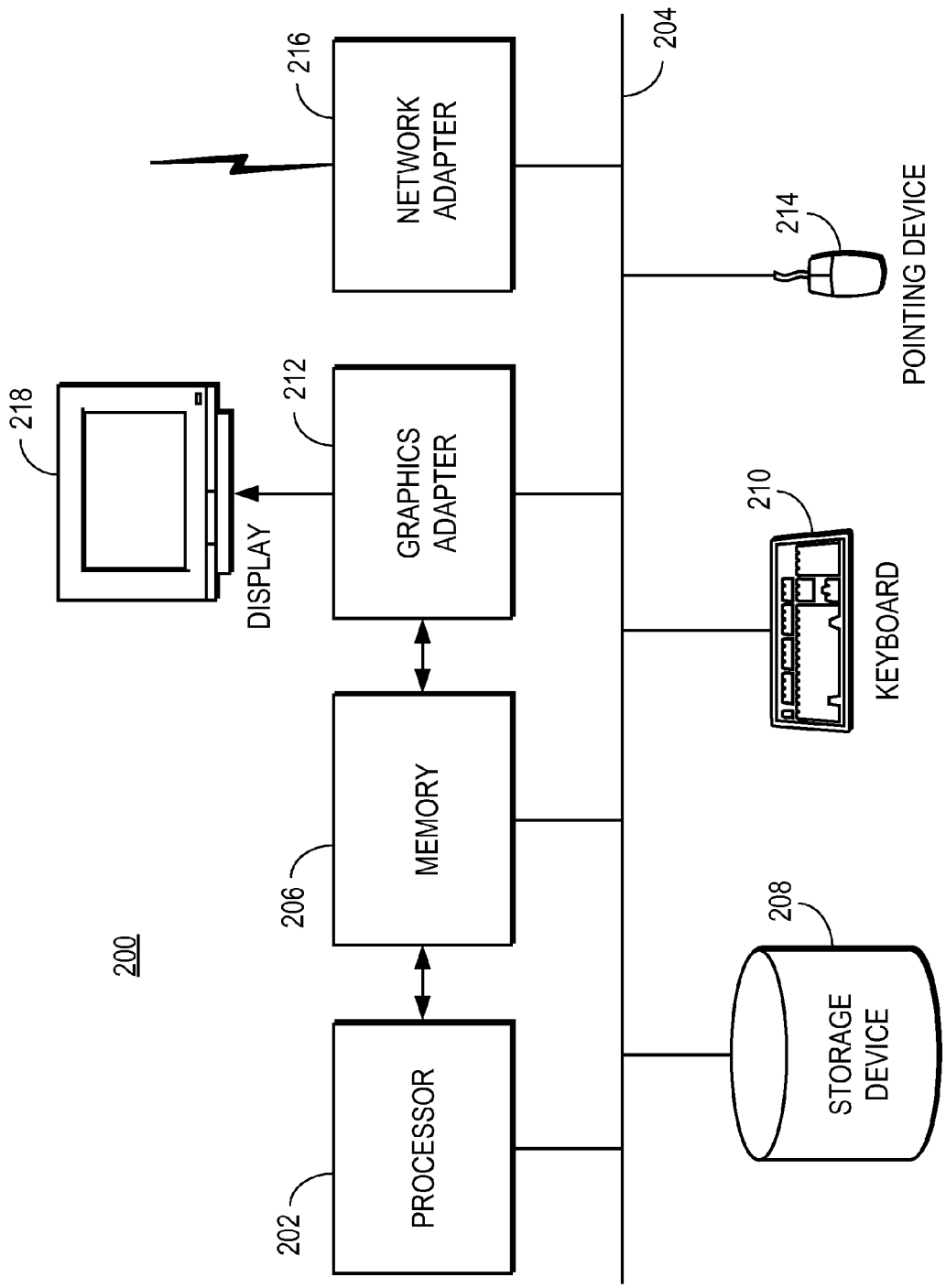
FIG. 2 is a high-level block diagram illustrating a typical computer system according to one embodiment.

FIG. 2 is a high-level block diagram illustrating a typical computer 200 for use as a client 104, a web server 110, 120, or the central authority 130. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the enterprise network 104.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computer systems 200 utilized by the entities of FIG. 1 can vary depending upon the embodiment and the processing power utilized by the entity. For example, a client 104 that is a mobile telephone typically has limited processing power, a small display 218, and might lack a pointing device 214. A computer system 200 used as a web server 110, 120 or the central authority 130 might have greater processing power and lack a display 218 or a keyboard 210.

Figure 3:
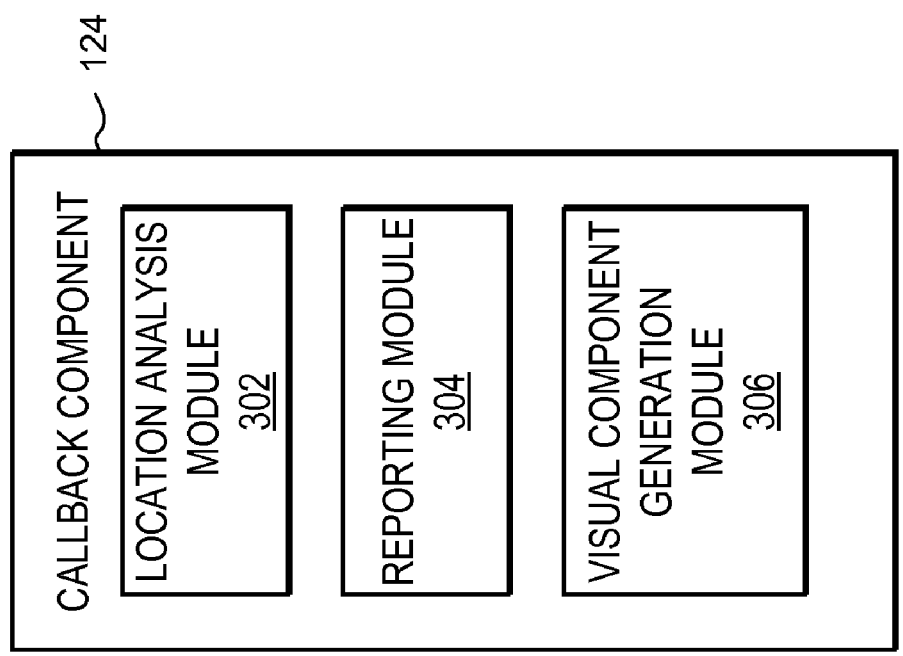
FIG. 3 is a block diagram of an embodiment of a callback component embedded on a web site.

FIG. 3 illustrates an example embodiment of a callback component 124. Note that although the description refers to the callback component 124, the description is also applicable to the copied callback component 114 on the fraudulent web site 112. The callback component 124 is typically implemented as a compiled object such as a Flash object or a Javascript object that is embedded on the web site 122. When the web site 122 is loaded by a client 104, the callback component 124 is also loaded and executes various functions as described below.

In one embodiment, the callback component 124 includes a location analysis module 302, a reporting module 304, and a visual component generation module 306. When the callback component 124 is loaded and executed by a browser on the client 104, the location analysis module 302 determines the location of the web site 122 in which the callback component 124 is embedded. The location of the web site 122 may be identified, for example, by a domain name of the server 120 hosting the web site 122. In one embodiment, the callback component 124 utilizes the Javascript object, "document.location.href". When a client 104 loads a web page from the web site 122, this object returns the domain of the web site 122 from which the web page was obtained. Other means for determining the host location of a web site 122 are known to those of ordinary skill in the art. In one embodiment, the location analysis module 302 also stores the known legitimate location of the trusted web site 122 (i.e. the domain where the web site 122 is intended to be hosted). The location detection module 302 compares the determined location to the known legitimate location to determine if the locations match.

The reporting module 304 transmits reports to the central authority 130 including information indicative of whether the web site is legitimate or fraudulent. In one embodiment, the reporting module 304 sends a report to the central authority 130 including the determined location whenever the location analysis module 302 detects that the determined location is different than the known legitimate location of the trusted web site 122. In an alternative embodiment, the reporting module 304 reports the determined location information to the central authority 130 together with an identity of the callback component 114, 124. The central authority 130 then determines if the callback component 114, 124 is reporting from a trusted website 122 or a fraudulent web site 112 based on a stored mapping between callback components 114, 124 and their intended host locations.

In one embodiment, the callback component 124 further includes a visual component generation module 306. The visual component generation module 306 generates a visual component (e.g., a Flash animation) on the web page when the web page is loaded by a client browser. The visual component can be, for example, a movie, image, or animation of the company logo or a logo of a trusted security vendor. This visual component of the callback component 124 makes the viewer aware of the presence of the callback component 124 when the web page is loaded. This visual component deters attackers from attempting to remove the copied callback component 114 from the fraudulent web site 112 because the absence of the visual component will alert a potential victim that the web site 114 may be fraudulent. In addition, by including a visual component that users associate with security on the trusted web site 122, the user's confidence in the web site 122 is increased. This allows companies to better communicate with customers through email or online accounts.

A phishing attacker may try to work around this security measure by attempting to remove the reporting module 304 of the copied callback component 114 while retaining the visual component generation module 306. However, this workaround would be difficult to achieve because the copied callback component 114 is implemented in a compiled object. Thus, a phishing attacker would first have to decompile the object and then reverse engineer the decompiled code in order to determine how to remove the reporting module 304. In one embodiment, the callback component 124 is implemented in a tamper-resistant format. In one embodiment, various code obfuscation techniques can be applied to the callback component 124 to make it difficult to remove the reporting module 304 or otherwise alter the callback component 124. For example, the object code may be written in a way that is intentionally very hard to read and understand. Such techniques are known to those of ordinary skill in the art.

Figure 4:
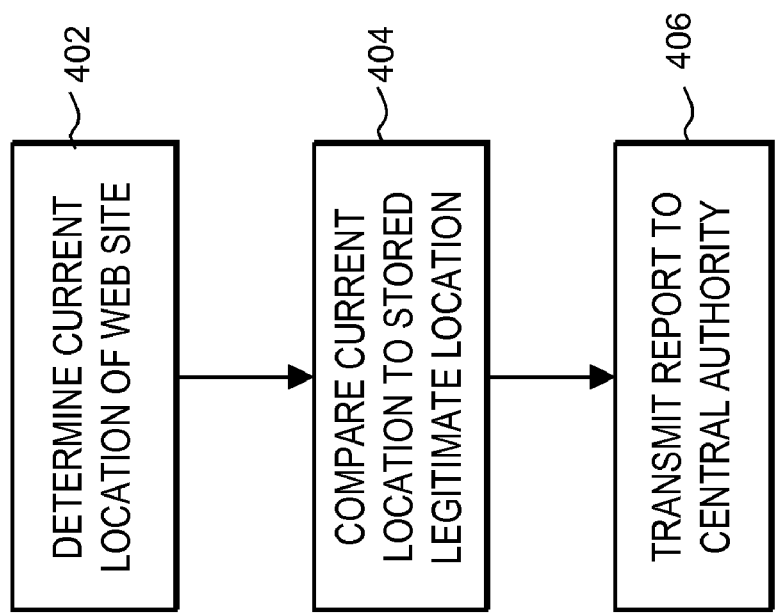
FIG. 4 is a flowchart illustrating an embodiment of a process executed by a callback component for detecting a fraudulent web site.

FIG. 4 illustrates an embodiment of a process executed by the callback component 112, 124 when the callback component 112, 124 is loaded by a client device 104. The location analysis module 302 determines 402 the current location of the web site having the embedded callback component 112, 124. The location analysis module 302 then compares 404 the current location to the stored legitimate location associated with the callback component 114, 124 (e.g. the trusted server 120) to determine if they are different. The reporting module 304 transmits 406 a report to the central authority 130 including the current location of the web site. In one embodiment, the report is only transmitted when the current location is different than the stored legitimate location.

Figure 5:
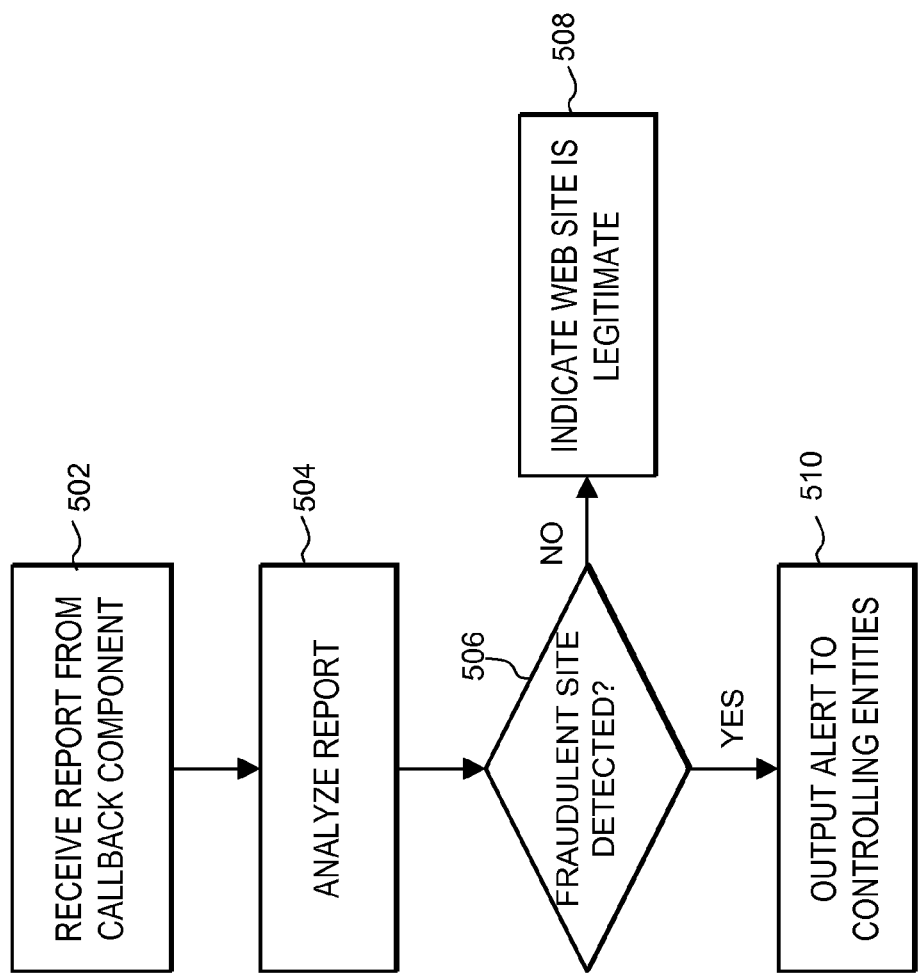
FIG. 5 is a flowchart illustrating an embodiment of a process executed by a central authority for detecting a fraudulent web site.

FIG. 5 illustrates a process executed by the central authority 130 in accordance with an embodiment of the present invention. The central authority 130 receives 502 a report from a callback component (e.g., the callback component 124 or copied callback component 114). The report includes the determined location of the web site with the embedded callback component. In one embodiment, the report indicates whether or not the host location of the callback component matches the known host location of the trusted web site 122. Alternatively, the report includes the determined location of the callback component and the central authority 130 determines if the locations match. The central authority 130 analyzes 504 the report to detect 506 if the report is coming from a fraudulent web site 112. If the central authority 130 does not detect a fraudulent web site 112 (i.e. the web site is hosted at its intended location), the central authority 130 indicates 508 that the web site is legitimate. If the central authority 130 detects a fraudulent web site 112, the central authority 130 outputs 510 an alert to one or more entities so that appropriate action can be taken against the fraudulent web site 112.

In one embodiment, the central authority 130 alerts 510 the domain name registrar that owns the domain name hosting the fraudulent web site 112. The registrar can then decide to discontinue the domain name registration for the fraudulent users. In other instances, the phishing attacker does not register the domain name, but instead takes over the domain from another web site owner. This type of attack can often be determined based on the age of the domain. When such an attack is discovered, the central authority 130 may alert the actual owner of the web site that has been compromised by the phishing attacker. In another embodiment, the central authority 130 alerts 410 maintainers of phishing black lists.

These black lists are linked to web browsers to automatically block access to web sites known to be used for phishing attacks. In yet another embodiment, the central authority 130 alerts one or more third party volunteer or commercial take down services. These services specialize in taking down web sites used for scamming purposes.

Some portions of above description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for spam detection and analysis through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the scope of the embodiments as defined in the appended claims.

The invention claimed is:

1. A computer-implemented method for detecting fraudulent web sites comprising:
    downloading a web page from a web server hosting a web site;
    loading, by a client, a callback component embedded on the web page downloaded from the web server, the callback component comprising computer-executable instructions executed by a processor of the client when an application loads the web page, the computer-executable instructions of the callback component identifying a known legitimate host location of a legitimate web site hosted by a trusted web server;
    determining a current host location of the web site hosted by the web server from which the web page was downloaded by executing the instructions of the callback component embedded on the web page;
    determining by executing the instructions of the callback component, if the current web location of the web site hosted by the web server is different than the known legitimate host location of the legitimate web site hosted by the trusted web server identified by the callback component;
    responsive to determining that the current host location of the web site hosted by the web server is different than the known legitimate host location of the legitimate web site hosted by the trusted web server, reporting to a central server that the web site is fraudulent by executing the instructions of the callback component.

2. The method of claim 1, further comprising:
    outputting an alert to one or more controlling entities responsive to determining that the web site is fraudulent.

3. The method of claim 2, wherein the one or more controlling entities comprises at least one of a registrar owning a domain name of the web site, an owner of the web site, and a take down service.

4. The method of claim 1, wherein determining if the current host location of the web site is different than the known legitimate host location comprises:
    retrieving the known legitimate host location of the legitimate web site hosted by the trusted web server from a memory; and
    comparing the current host location of the web site hosted by the web server to the known legitimate host location of the legitimate web site hosted by the trusted web server.

5. The method of claim 1, wherein the callback component generates a visual component viewable on the web page when the web page is loaded by the client.

6. The method of claim 1, wherein the callback component comprises obfuscated code that is resistant to tampering.

7. A non-transitory computer readable storage medium having embodied therein computer program instructions for detecting fraudulent web sites, the computer program instructions comprising:
    instructions that when executed cause a computer system to generate a web page for display by a browser, the web page including a callback component embedded on the web page, the callback component executed when the browser loads the web page, the callback component including identifying information associating the callback component with a known legitimate host location of a legitimate host site hosted by a trusted web server;
    a location analysis module embodied in the callback component of the web page, the location analysis module when executed causing the computer system to determine a current host location of a web site hosted by a web server from which the web page was downloaded, the location analysis module executed when the browser loads the web page; and
    a reporting module embodied in the callback component of the web page, the reporting module when executed causing the computer system to transmit a report to a central server, the report including the current host location of the web site hosted by the web server, wherein the central server determines if the web site hosted by the web server is fraudulent based on the report.

8. The non-transitory computer readable storage medium of claim 7, wherein the location analysis module when executed further determines if the current host location of the web site hosted by the web server is different than the known legitimate location of the legitimate web site hosted by the trusted web server and wherein the report further includes an indication of whether the current host location is different than the known legitimate host location.

9. The non-transitory computer readable storage medium of claim 7, wherein the central server determines if the current host location of the web site hosted by the web server is different than the known legitimate location of the legitimate web site hosted by the trusted web server based on the report.

10. The non-transitory computer readable storage medium of claim 7, wherein the central server outputs an alert to one or more controlling entities responsive to determining that the web site hosted by the web server is fraudulent.

11. The non-transitory computer readable storage medium of claim 7, wherein the computer program instructions further comprise:
a visual component generation module for generating a visual component viewable on the web page when the web page is loaded by a client device.

12. The non-transitory computer readable storage medium of claim 11, wherein the location analysis module, the reporting module, and the visual component generation module are embedded in a compiled object having a tamper-resistant format.

13. The non-transitory computer readable storage medium of claim 7, wherein the central server further tracks statistics of the callback component including a frequency of reports received from based on execution of the callback component.

14. A computer-implemented method for detecting fraudulent web sites comprising:
providing, by a central server, a callback component for embedding on a web page, the callback component comprising computer executable instructions configured to execute upon a client application loading the web page to identify a known legitimate host location of a legitimate web site hosted by a trusted web server, determine a current host location of a web site hosted by a web server from which the web page is downloaded, and report the current host location to the central server;
receiving the report from a client executing the callback component embedded on the web page downloaded from the web server hosting the web site, the report including the current host location of the web site determined by executing the callback component;
determining, based on the report, if the current host location of the web site hosted by the web server is different than the known legitimate host location of the legitimate web site hosted by the trusted web server;
responsive to the central server determining that the current host location of the web site hosted by the web server is different than the known legitimate location of the legitimate web site hosted by the trusted web server, alerting one or more controlling entities that the web site is fraudulent.

15. The method of claim 14, wherein determining if the current host location of the web site hosted by the web server is different than the known legitimate host location of the legitimate web site hosted by the trusted web server comprises:
retrieving the known legitimate host location of the web site hosted by the web server from a memory based on an identifier of the callback component included in the report; and
comparing the known legitimate host location of the legitimate web site to the current host location of the web site received in the report.

16. The method of claim 14, wherein the report includes an indication of whether the current host location of the web site hosted by the web server is different than the known legitimate host location of the legitimate web site hosted by the trusted web server.

17. The method of claim 14, wherein the one or more controlling entities comprises at least one of a registrar owning a domain name of the web site, an owner of the web site, and a take down service.

18. The method of claim 14, wherein the callback component generates a visual component viewable on the web page when the web page is loaded by a client device.

19. The method of claim 14, wherein the callback component comprises obfuscated code that is resistant to tampering.

20. The method of claim 14, further comprising:
tracking statistics of the callback component including a frequency of reports associated with the callback component.

* * * * *